Patented Dec. 28, 1948

2,457,404

UNITED STATES PATENT OFFICE 2,457,404

NITROPARAFFIN MODIFIED AMINOPLASTS

Milton J. Scott, Springfield, Mass., assignor to Monsanto Chemical Company, St. Louis, Mo., a corporation of Delaware No Drawing. Application September 25, 1945, Serial No. 618,588

7 Claims. (Cl. 260—67.6)

This invention relates to aminotriazine reaction products. More particularly the invention relates to reaction products of aminotriazines and nitroparaffins and to methods of making such products.

An object of this invention is to provide new aminotriazine reaction products.

A further object is to provide nitroparaffin modified aminotriazines.

These and other objects are obtained by reacting nitroparaffins with aminotriazines in the presence of aldehydes. In a further embodiment of the invention nitroparaffins are reacted with alkylol aminotriazines with or without unsubstituted alcohols as a third component of the reaction.

The following examples are given in illustration of this invention and are not intended to limit the scope thereof. Where parts are mentioned they are parts by weight.

Example I 486 parts (6 mols) of formalin (37% formaldehyde) and 267 parts (3 mols) of 2-nitro propane were added to an aqueous suspension containing 126 parts (1 mol) of melamine. The pH of the admixture was adjusted to about 8–9 with alkali and the mixture was then heated under reflux at atmospheric pressure for one hour. A dark colored aqueous solution was obtained. The solution was treated with alkali to readjust the pH to about 8–9 and then dehydrated under vacuum to obtain a brown resin. The resin was at least partially soluble in alcohols, ketones, dioxane and water.

Example II 366 parts (6 mols) of nitromethane were added to an aqueous suspension containing 206 parts (1 mol) of hexamethylol melamine and the pH of the mixture was adjusted to about 6–8 by the addition of alkali. The mixture was refluxed for 90 minutes at atmospheric pressure to obtain a straw colored aqueous solution from which a light yellow resin was obtained on neutralization and vacuum distillation. The resin was at least partially soluble in alcohols, ketones, dioxane and water.

Example III 206 parts (1 mol) of hexamethylol melamine were suspended in 96 parts of methanol (3 mols). 183 parts (3 mols) of nitromethane and 5 cc. phosphoric acid were added to the suspension and the mixture refluxed at atmospheric pressure for 2 hours. The resulting solution was neutralized and vacuum dehydrated to recover the resin. The resin was light brown in color and was water soluble. The resin was at least partially soluble in alcohols, ketones, dioxane and water.

Example IV 126 parts (1 mol) of melamine were mixed with 380 parts (5 mols) of formalin (37% formaldehyde), 592 parts (8 mols) of butanol and 183 parts (3 mols) of nitromethane. The pH of the mixture was adjusted to about 6 to 7 with alkali and the temperature of the mixture was raised until azeotropic distillation of butanol and water began. The reaction was continued at this temperature and the butanol rich phase of the distillate continuously returned to the reaction until only a single phase was found in the distillate. At this point anhydrous butanol was added to the reaction mixture and wet butanol distilled from the mixture until the specific gravity of the distillate indicated that substantially all of the water had been removed from the mixture. The mixture was then concentrated by vacuum distillation and xylol was added to the concentrate to obtain a clear substantially colorless syrup. The resin, which was obtained by vacuum evaporation of the final reaction mixture, was insoluble in water, soluble in alcohol, ketones, dioxane and at least partially soluble in coal tar solvents and mineral spirits.

The resins produced as shown in the examples may be recovered from solution by other conventional methods such as oven drying, etc.

The nitroparaffins which may be used in this invention are organic compounds of the paraffin series in which at least one hydrogen has been replaced by an $NO_2$ group and in which at least one hydrogen atom is attached to the same carbon atom to which the $NO_2$ group is attached. Examples of nitroparaffins which may replace in whole or in part the nitroparaffins shown in the examples include nitroethane, 1-nitrobutane, 1-nitropropane, 1-nitro-2-methyl propane. Mixtures of the nitroparaffins may also be used.

Other aldehydes may be used to replace the formaldehyde of Example I and IV or to produce the alkylol aminotriazine of Examples II and III such as saturated and unsaturated alkyl, aralkyl, aryl, and heterocyclic aldehydes, for example acetaldehyde, propionaldehyde, butyraldehyde, crotonaldehyde, acrolein, benzaldehyde, cinnamaldehyde, furfural, etc. Mixtures of the above named aldehydes may also be employed.

The melamine shown in the above Examples may be replaced in whole or in part by other aminotriazines such as 2,4-diamino-1,3,5-triazine, 2-amino-1,3,5-triazine, melam, melem, aminotriazines in which one or two amino groups are substituted by hydroxy, halogen, alkyl, aryl or aralkyl groups such as 2-hydroxy-4,6-diamino-1,3,5-triazine, 2,4-dihydroxy-6-amino-1,3,5-triazine, 2-chloro-4,6-diamino-1,3,5-triazine, 2-p-hydroxy-phenylene-4,6-diamino-1,3,5-triazine, 2-phenyl-4-amino-6-hydroxy-1,3,5-triazine, aminotriazines wherein the hydrogen atoms of the amino groups are partially substituted by amino, alkyl, aryl or aralkyl groups such as mono-, di-, or tri-alkyl-melamines, e. g., 2,4,6-triethyl-triamino-1,3,5-triazine, mono-, di-, or tri aralkyl- or mono, di-, or tri aryl melamines, e. g., 2,4,6-triphenyl-triamino-1,3,5-triazine, etc. Mixtures of the aminotriazines may be employed.

In Example III, the methanol may be replaced in whole or in part by aliphatic, aromatic or mixed aliphatic aromatic alcohols or mixtures of such alcohols. For example, methanol, ethanol, propanol, butanol, benzyl alcohol, polyhydric alcohols, such as glycol, glycerol, etc. may be used.

The resins obtained vary in color, water solubility and other physical characteristics such as hardness, elasticity, electrical resistance, etc., depending on (1) the aminotriazine used, (2) the nitroparaffin used, (3) the alcohol used, (4) the aldehyde used, and (5) the proportions of the various reactants used. As a result, the product may be tailored to suit the particular application for which it is intended.

The resins may be hardened by heating with or without the addition of acid reacting catalysts which may be acids per se, acid salts or materials which may become acidic under heat. Such catalysts include diammonium phosphate, ammonium oxalate or other ammonium salts, other acid reacting salts, etc.

The resins may be used in protective coatings, textile sizes, paper sizes, binders for low pressure laminates such as fiber glass or plywood laminates, binders for abrasives and in many other industrial fields.

The resins may be compounded with other conventional ingredients varying according to the properties desired. For example, there may be added filler, pigments, dyes, natural or synthetic resins such as rosin, kauri, alkyd resins, vinyl resins, cellulose derivatives, urea resins, urea-thiourea resins, drying oils such as linseed oil, tung oil, etc. For example, a coating composition comprising 100 parts of an alkyd resin such as a dehydrated castor oil modified glyceryl phthalate resin, 20 parts of a resin made according to Example I, and 0.02 part of a manganese drier, produced hard glossy films having improved chemical and water resistance when compared to the unmodified alkyd resin.

The resins may also be used to treat textiles, paper and other fibrous materials to decrease their moisture absorption, increase their resistance to fungi, mildew, insects, etc., to shrinkproof fabrics and increase the wet strength of paper.

The foregoing description is given in illustration and not in limitation of the invention as set forth in the appended claims.

What is claimed is:

1. A resinous heat reaction product of an aminotriazine-aldehyde condensation product and a mononitro paraffin containing from 1 to 4 carbon atoms in which at least one hydrogen atom is attached to the same carbon atom to which the nitro group is attached, the mol ratio of nitroparaffin to aminotriazine varying from 3–6 to 1.

2. A resinous heat reaction product as in claim 1 wherein the aminotriazine is melamine.

3. A resinous heat reaction product as in claim 2 wherein the aldehyde is formaldehyde.

4. A resinous heat reaction product as in claim 3 wherein the nitroparaffin is nitromethane.

5. A resinous heat reaction product of hexamethylol melamine and nitromethane.

6. A resinous heat reaction product of an aminotriazine-aldehyde condensation product, an unsubstituted alcohol and a mononitro paraffin containing 1 to 4 carbon atoms in which at least one hydrogen atom is attached to the same carbon atom to which the nitro group is attached, the mol ratio of nitroparaffin to aminotriazine varying from 3–6 to 1.

7. A resinous heat reaction product as in claim 6 wherein the aminotriazine is melamine.

MILTON J. SCOTT.

REFERENCES CITED

The following references are of record in the file of this patent:

UNITED STATES PATENTS

| Number    | Name    | Date          |
|-----------|---------|---------------|
| 2,187,566 | Bruson  | Jan. 16, 1940 |
| 2,314,308 | Ellis   | Mar. 16, 1943 |
| 2,315,401 | D'Alelio| Mar. 30, 1943 |
| 2,335,701 | Root    | Nov. 30, 1943 |
| 2,339,622 | D'Alelio| Jan. 18, 1944 |
| 2,347,436 | Root    | Apr. 25, 1944 |

OTHER REFERENCES

Fuson and Snyder, Organic Chemistry, page 157 (1942), John Wiley & Sons.

Bogin Ind. and Eng. Chem., September 1942, pp. 1091–1096.

Synthetic Resins, pp. 57–61, 64–66; The Resinous Products and Chemical Co., June 1944.